Nov. 21, 1944. O. W. BOUGHTON ET AL 2,363,388
OPTICAL INSTRUMENT
Filed March 7, 1942 2 Sheets-Sheet 2
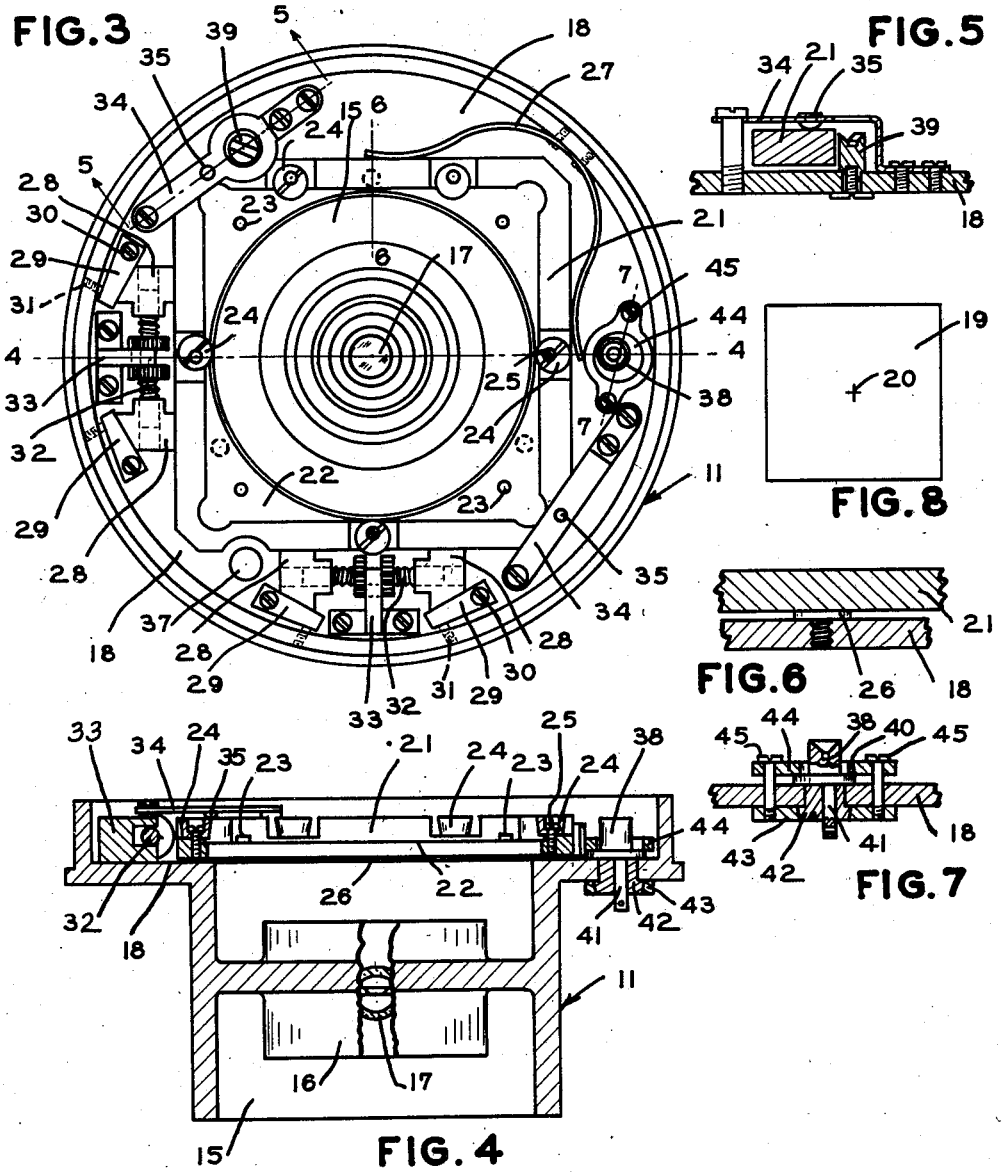
OLIN W. BOUGHTON
HENRY F. KURTZ
INVENTORS
ATTORNEYS Patented Nov. 21, 1944

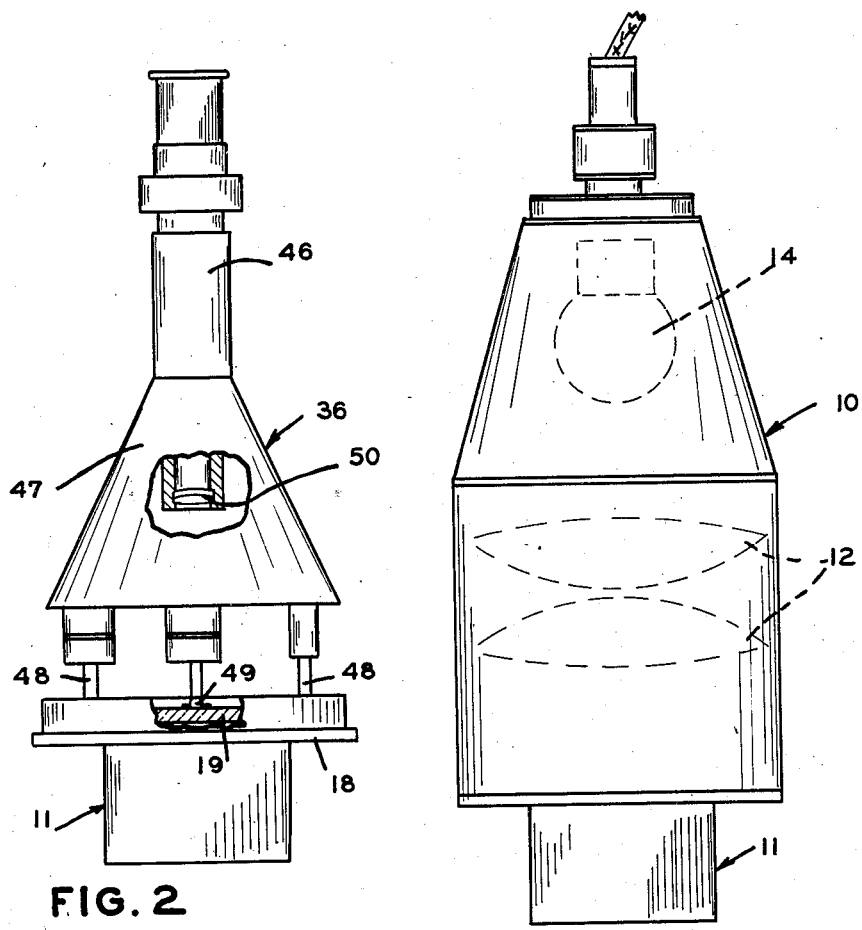

2,363,388

UNITED STATES PATENT OFFICE 2,363,388

OPTICAL INSTRUMENT

Olin W. Boughton, Victor, and Henry F. Kurtz, Rochester, N. Y., assignors to Bausch & Lomb Optical Company, Rochester, N. Y., a corporation of New York Application March 7, 1942, Serial No. 433,814

7 Claims. (Cl. 88—26)

The invention relates to optical apparatus and more particularly has reference to instruments such as projectors and the transparency holding means therefor.

In certain uses of projectors, notably in connection with their employment in the art of aerial mapping, the center of the transparency to be projected must be accurately located with respect to the optical axis of the instrument. It is desirable to accomplish this with a degree of precision which is higher than that attained with devices of the prior art.

Hence an object of this invention is to provide an improved projection system. Another object is the provision in a projector of novel means for holding a diapositive or other transparency. Yet another object is to devise a transparency holder which permits the transparency to be located with respect to the optical axis of the optical system with exceedingly fine accuracy. A further object of the invention resides in the provision of means for adjusting the diapositive holder of a projector by applying a plurality of forces of variable magnitudes to each of a pair of adjacent sides of the holder while urging the holder against these forces. These and other objects and advantages reside in certain novel features of construction, arrangement and combination of parts to be hereinafter more fully set forth and claimed.

Referring to the drawings, wherein like reference characters indicate like parts throughout the different views:

Figure 1 is a side elevation of an optical instrument which embodies the invention.

Figure 2 is a side elevation of the support which carries the diapositive in the instrument of Figure 1 together with a microscope in position on the support to aid in the location of the diapositive with respect to the optical axis of the instrument.

Figure 3 is a plan view of the support and diapositive holder assembly.

Figure 4 is a sectional elevation on the line 4—4 of Figure 3.

Figures 5, 6 and 7 are broken away sectional elevations taken respectively on the lines 5—5, 6—6 and 7—7 of Figure 3.

Figure 8 is a plan view of a diapositive used with the invention.

The invention is illustrated in connection with a projector comprising a housing 10 which is mounted on a support 11 adapted to be carried on a suitable arm, not shown in the drawings. Support 11 is mounted in such manner that it is rotatable about the optical axis of the projector. Within the housing 10 are condenser lenses 12 and a light source such as the electric bulb 14 carried in a conventional socket which is adapted to be connected to a suitable source of electricity.

An opening 15 extends through the support 11 and has a lens mount 16 therein for the objective lens 17. One end of support 11 has a flanged portion which surrounds the opening 15 and provides a support surface or stage 18 for a diapositive holder and also a seat for the housing 10. The latter is removably secured to the support in any conventional manner. When housing 10 and support 11 are assembled as shown in Figure 1, the lenses 12 and 17 and the light source 14 are located in suitable alignment and the optical axis of the system is positioned so that it is substantially perpendicular to the plane of the surface 18.

The just described system provides a conventional means for projecting a transparency, such as the diapositive plate 19. This is shown in Figure 8 as having a fiducial mark 20 located at substantially the center of one of its surfaces through which light is projected. Diapositive 19 is adapted to be carried in a holder 21, which is disclosed in Figures 3 and 4, in the form of a quadrilateral shaped frame provided with the flat flange portion 22 in surrounding relation to the opening through the holder. Buttons 23, which project above the flange 22, provide a seat on which the diapositive 19 is slidably mounted. These buttons 23 are adapted to support the working faces of the diapositive in planes which are substantially parallel to the flange 22. Where desired, holder 21 may be formed to other geometrical shape.

The dimensions between the sides of the diapositive holder 21 are sufficiently great to allow considerable play between them and the largest diapositive plate 19 that the holder is expected to accommodate. This permits a diapositive 19 to be readily seated in the holder 21. In use of the instrument, the diapositive is approximately centered with respect to the opening through the seat 22 of the holder and is retained in the holder in such position. This practice is made possible by providing cutaway portions in the sides of the holder 21 in which camming means in the form of conical or tapered rollers 24 are eccentrically mounted for rotation on studs 25.

Each stud 25 is threaded into the holder to extend in a direction substantially parallel to the optical axis of the projector. A suitable head on each stud retains the roller thereon. Adjustment of the various studs 25 controls the ease with which the rollers 24 are rotated. A slot in the end of each roller most distant from the holder 21 is provided to facilitate rotation of the same. Five rollers are shown, two on one side of the holder 21 and one on each of the other sides. The pair of rollers on the same side and the roller on a side adjacent thereto are employed in approximately centering the diapositive while they serve with the other rollers to retain the diapositive in the holder in its centered position.

When mounting a diapositive in the holder 21, the camming means are rotated to positions of minimum throw so that the portions of the surfaces of rollers 24 adapted to contact the diapositive 19 are located towards the outside of the holder and away from its center. Following this procedure, a diapositive is placed in the holder and the three rollers used for centering are properly manipulated so that the diapositive will be roughly centered when two of its adjacent sides are moved into contact with these rollers. The retention of the diapositive plate in the holder is then effected by rotation of the remaining rollers 24 to bring their contact surfaces into bearing with the diapositive. Rotation of the rollers 24 in the reverse direction will free them from contact with the diapositive plate 19 and permit the removal of the latter from the holder 21.

As heretofore noted, it is desirable in certain types of projectors to accurately locate the fiducial mark of the diapositive on the optical axis of the instrument. For this reason the diapositive holder 21 is mounted on the support 11 so that it is slidable over the surface 18 and means are provided for adjusting its position. In carrying this out, three pads 26 are adjustably mounted on the support 11 as shown in Figures 3 and 6 to extend above the surface 18. The flange 22 of the diapositive holder 21 slidably rests on these pads which are accurately positioned and machined so that the faces of the seat as well as those of any diapositive mounted therein will be maintained in planes which are substantially perpendicular to the optical axis of the projector. Incidentally, very accurate machining of the surface 18 and the faces of the flange 22 of the holder 21 is avoided by use of the buttons 23 and pads 26.

The adjusting means for the holder 21 makes use of a yieldable member, such as the flat spring 27, secured to the support 11 as shown in Figure 3. Spring 27 engages a pair of adjacent sides of the plate holder and is adapted to constantly urge it toward the opening 15 in the support 11. Movement of the holder by the spring is resisted by adjustable pressure exerting means for applying variable pressure to each side of the second pair of adjacent sides of the diapositive holder in a direction which is substantially perpendicular to these sides and which is towards the opening in the support 11.

The pressure applying means employ wedge shaped slide members 28 for moving the holder 21 against the spring 27, slide members 28 being slidably supported on the surface 18. A pair of slide members 28 are located next to each of the adjacent sides of the holder 21 which are uncontacted by the spring 27. Each slide member 28 has a bearing surface which is slidable on a side of the holder 21 and a second bearing surface which is slidable on the working surface of a cam 29, one such cam being provided for each slide member. The second bearing surface, which forms the wedge end of each slide member, is inclined to the first mentioned or the straight bearing surface of each slide member. Cams 29 are each adjustably mounted on separate pivot screws 30 which are threaded into the surface 18 and the cams are positioned against separate adjustable stops 31 carried by the support 11 adjacent each cam. Slide members 28 are similar to each other as is also the case of the cams 29.

The cams for each pair of slide members 28 are positioned so that when the slide members of a pair are at similar locations on their respective cams, the straight bearing surfaces of that pair of slide members will lie in a common plane. By design, the cams are mounted on the surface 18 in such manner that when the just mentioned condition of adjustment is fulfilled, the planes common to the straight bearing surfaces of the pairs of slide members 28 will be substantially perpendicular to each other.

Movement of each pair of slide members is effected through a separate adjusting screw 32, the unthreaded central portion of which is rotatably supported by a bearing bracket 33 mounted on the surface 18. Each threaded end of each screw 32 engages a threaded bore in an adjacent slide member 28. Knurled finger pieces are provided on each screw adjacent its bracket 33 to facilitate its operation.

It will be apparent that both of the slide members 28 which are engaged by a screw 32 will be moved, by like amounts, over their cams 29 and the side of the holder to which they are adjacent in accordance with the rotation of the screw. When the slide members of a pair are moved away from each other, their wedge shape in conjunction with their cams, will cause their straight bearing surfaces to be moved inwardly towards the opening in the support 11. This movement of a pair of slide members, obviously, creates parallel forces at several locations on the side of the holder 21 adjacent the pair of actuated slide members. These forces will be transmitted in substantially perpendicular relation to the side of the holder and in substantially parallel relation to the surface 18 in a direction toward the opening in the support.

The resultants of these parallel forces on a side of the holder 21, will of course occur at points substantially equidistant from the center of the side on which the forces are applied and will push the holder in the direction of their application. It is to be noted that the direction of application of the parallel forces developed by a pair of slide members on one side of the holder is substantially at right angles to that on the adjacent side of the holder 21.

The described pressure applying means will cause the holder 21 to be moved against the yieldable member or spring 27, which latter is sufficiently strong to constantly urge the holder against the pairs of slide members. Movement of each of the slide members of a pair towards each other, on the suitable actuation of their adjusting screw 32, will cause their withdrawal towards the outer edge of the surface 18. As a result, pressure on the side of the holder, which is adjacent the slide members thus moved, will be released and energy stored in the spring 27 will cause the holder to be moved so as to maintain contact with the slide members.

It will be apparent that holder 21 may be moved back and forth over the surface 18 upon suitable manipulation of the adjusting screws 32 so that the fiducial mark 20 on a diapositive 19 carried in the holder may be centered on the optical axis of the projector. To be noted is the fact that the screw adjustments 32 provide a delicate control for the movement of the holder. This control and the transmission of pressure at two locations on each of two sides of the holder permit the latter to be centered with a high degree of accuracy.

Material twisting movement of the holder 21 during centering operations, a disadvantage of prior art devices, is avoided by this invention. Such is made possible by contacting each of two adjacent sides of the holder 21 against a pair of bearing surfaces rather than against the customary single bearing surface located centrally of each of such sides and about which the holder is easily pivoted when the force applied at such a bearing surface is not at normal incidence thereto.

Hold down springs 34, adapted to insure maintenance of the holder 21 in operating relation to the spring 27 and slide members 28, are secured to the surface 18 by screws or other fastenings. Two springs 34 are employed, one positioned across each corner of the holder 21 which is adjacent an end of the spring 27. Each spring 34 is provided with a contact button 35 adapted to be held in bearing with the upper surface of the holder 21.

Assuming that the contact surfaces of the sides of the holder, slide members 28 and cams 29 are machined with good accuracy and that the positions of the cams are properly adjusted, the use of hold down springs 34 is unnecessary to the operation of the instrument. From a practical standpoint, however, to care for inequalities of adjustment of the cams 29, springs 34 are employed to counteract any tendency of the holder 21 to become displaced from its operating position.

In practice, the fiducial mark on the diapositive is aligned with the optical axis of the projector with the aid of a three legged centering microscope 36 such as shown in Figure 2. Microscope 36 is adapted to be removably mounted on the surface 18, when the housing 10 is removed from the support 11, so that the optical axis of the microscope substantially coincides with that of the projector. For this purpose three pads 37, 38 and 39 are provided on the surface 18 to support the microscope feet. Pads 37 and 39 have support surfaces which are respectively flat and in the shape of a tapered slot. Both of the pads 37 and 39 are fixedly secured to the surface 18 by, for example, the threaded fastening means shown in Figure 5. Pad 38, which has a conical support surface, is adjustably mounted on the surface 18 so that its center may be located at equal distances from the centers of the other pads.

All of the microscope pads on the surface 18 are adapted to support the feet of the microscope 36 in a plane which is substantially perpendicular to the optical axis of the projector. As pad 39 is located below one of the hold down springs 34, this spring is provided with an enlarged portion having an opening to permit a microscope leg to extend therethrough.

With reference to Figures 4 and 7, pad 38 is mounted on an eccentric arm 40, the pin 41 of which is journalled in a bushing 42 rotatable in a bearing plate 43. Plate 43 is carried below the surface 18 by the use of a clamp collar 44 which slips over the pad 38 and is secured to this plate by bolts 45. Pin 41 is located eccentrically of the bushing 42 so that a double eccentric for adjusting the position of the pad 38 is provided. Suitable rotation of the bolts 45 will determine the clamping pressure on the eccentric arm 40 so as to permit adjusting or clamping of the pad 38.

The microscope 36 comprises the body tube 46 supported on a conical shaped hollow member 47 which has three substantially equal length legs 48 located to have their support ends in a common plane at substantially equal distances from each other. Each leg 48 has a similar ball shaped foot 49. This construction provides a tripod type of support for the body tube which carries a conventional objective 50 and has the usual eyepiece. The microscope 36 is constructed and adjusted so that its optical axis is substantially normal to the plane in which the bearing surfaces of the feet 49 lie and the axis passes through this plane at a point substantially equidistant from each foot. A cross hair, not shown but provided in the eyepiece, is centered on the optical axis of the microscope.

As already indicated, centering of a diapositive is dependent on the microscope 36 being mounted on the support 11 so that the optical axes of the microscope and the projector substantially coincide. Attainment of this condition is controlled by the positions of the microscope pads with respect to each other. The centers of pads 37 and 39 are separated by a distance which is substantially equal to that between the centers of any pair of feet of the microscope and pad 38 is located so that when it is adjusted, its center will be at a similar distance from the centers of the other pads.

The positioning of pad 38 is made in a manner well known to the art, the pad being held in adjusted position by engagement of its clamp collar 44. As a result of this adjustment, the microscope 36 when seated on its pads will be held in the desired position. Adjustment of the microscope pads is a part of the mechanical adjustment of the projector and once made is repeated only to care for displacement of the pad 38 relative to the pads 37 and 39.

With the microscope pads in adjustment, a diapositive 19 is located in projecting position by first removing the housing 10 from the support and then placing the diapositive in the holder 21. The fiducial mark 20 of the diapositive is then roughly centered with respect to the opening in the holder 21 by means of the eccentric rollers 24 which also serve to lock the diapositive in such position. To facilitate observation of the mark 20, the diapositive is suitably illuminated by, for example, light incident to its surface and the microscope 36 is seated on its pads 37, 38 and 39. Due to the positioning of the pads and the construction of the feet of the microscope, that instrument will be mounted on support 11 so that its optical axis coincides with that of the projector.

It is now only necessary to observe the mark 20 through the microscope and by the proper actuation of the adjusting screws 32 to suitably move the holder 21 until the fiducial mark is aligned with the cross hairs in the microscope eyepiece. When this latter is accomplished, the mark 20 on the diapositive will be located on the optical axis of the projector. The microscope may now be removed and the housing 10 remounted on the support 11, following which procedure, the diapositive is ready to be projected in the usual manner.

From the foregoing, it will be appreciated that the aims and objects of the invention have been attained in that there has been provided an improved projection system which makes use of novel means for adjusting the position of the transparency to be displayed. At the same time, there has been disclosed means for holding and adjusting the position of a diapositive, which are of simple construction and operation and which permit adjustment with a fine degree of precision.

We claim:

1. An optical instrument comprising a projection system having separated lens means, a support interposed between said lens means, an object holder slidable over a surface of said support, the support having an opening which extends through said surface, the optical axis of said system extending through said opening, holding means carried by said support for engaging said holder to retain it in mounted position on said support, a single elongate resilient means on the support yieldably engaging a pair of adjoining sides of said holder, separately actuated sliding means engaging each of a pair of different adjacent sides of said holder and movable therealong in oblique paths of movement to urge said holder in angularly displaced paths of movement whereby the holder may be selectively moved over said surface against the action of said resilient means to center an object carried by the holder on said optical axis.

2. An optical instrument having a projection system comprising separated lens means and a light source, said lens means and light source aligned on the optical axis of said system, a support having an opening, one of said lens means carried in said opening, the surface of said support surrounding said opening being substantially perpendicular to said optical axis, an object holder slidably supported on said surface, yieldable means on said support engaging a pair of adjacent sides of said holder for urging the holder towards the center of said opening, a pair of cam members on said support opposite each side of a second pair of adjacent sides of said holder, a separate slide member movable over each cam, each slide member having an inclined end which is in bearing contact with its respective cam and a straight end which is in bearing contact with the side of the holder opposite such cam and separate manually operated means interconnecting each pair of slide members whereby to cause their movement over their respective cams.

3. In a projection system having a support provided with an opening through which the optical axis of the system passes and an object holder slidably mounted for adjusting movement with respect to said optical axis on the surface of the support which surrounds the opening, the combination of a seat on said holder for an object, a plurality of camming means on said holder for contacting an object on said seat whereby to adjust the location of the object with respect to the seat and to retain the object on said holder in its adjusted position, yieldable means on said support engaging a pair of adjacent sides of the holder, separate cam members on said surface opposite each side of a second pair of adjacent sides of said holder, separate movable wedge shaped means each in bearing contact with a separate cam member and the side of the holder opposite such cam member, said yieldable means urging said holder against said movable means, and separate actuating means connected to each pair of movable means to slide them over their respective cam members whereby to move each pair of movable means towards and away from said opening to cause adjustment of the position of said holder.

4. In a projection system, a support provided with an opening through which the optical axis of the system passes, a rectangular plate holder surrounding said opening and slidably mounted on said support for adjusting movement toward and away from the optical axis of the system, a pair of resilient means engaging an adjacent pair of sides of said holder, each resilient means tending to move said holder in a path parallel to one of the sides of said holder, means slidably engaging said holder on adjacent sides opposite the sides engaged by said resilient means, means for selectively moving the means slidably engaging the holder in oblique paths relative to the sides engaged thereby, said movement of said engaging means urging said holder in a direction opposite to the direction of movement created by the forces applied by said resilient means.

5. An optical instrument having a projection system comprising separated lens means, a light source, said lens means and light source aligned on the optical axis of said system, a support having an opening, one of said lens means carried in said opening, the surface of said support surrounding said opening being substantially perpendicular to said optical axis, an apertured plate holder slidably mounted on said surface, a pair of resilient means yieldably exerting angularly related forces against an adjacent pair of edges of said holder, the resultant of said forces tending to move said holder across said opening, independently operated adjusting means engaging opposite adjacent pairs of edges of said holder, each means comprising a pair of members engaging an edge at spaced points therealong, independent operation of said adjusting means exerting parallel forces opposite to one of the components of said resultant force and moving said holder relative to said opening whereby said holder may be adjusted relative to said support so that the aperture therein may be brought into substantial registry with the opening of said support.

6. In a projection system, a support provided with an opening through which the optical axis of the system passes, a plate holder having an opening therethrough, said holder being slidably mounted on said support whereby the opening therethrough may be aligned with the opening of said support, an elongated resilient member fixed intermediate the ends thereof to said support, the opposite ends of said member yieldably engaging adjacent sides of said holder and urging said holder across the opening of said support, a pair of slide members engaging each of the remaining sides of said holder, a single actuator for moving each pair of slides, and cam means engaging said slide members for causing said slide members as they are moved relative to said cam means to apply forces to said holder directed toward the center of said opening thereby moving said holder against the action of said resilient means to adjust the position thereof.

7. In a projection system having a support provided with an opening through which the optical axis of the system passes, a plate holder surrounding said opening and slidably mounted on said support for adjusting movement with respect to said optical axis, a seat on said holder, a plate on said seat, a plurality of eccentrically mounted rollers on said holder, said rollers upon rotation thereof being movable into engagement with said plate for selectively adjusting the position of the same relative to the seat and for retaining the plate on said holder in its adjusted position, resilient means on said support engaging two adjacent sides of the holder, means slidably engaging each of a second pair of adjacent sides of said holder, and means for independently moving each of said last-named means in a path oblique to the side of the holder engaged thereby whereby the position of the holder is adjusted in accordance with the position of said engaging means, said yieldable means urging said holder against said sliding means in all positions thereof.

OLIN W. BOUGHTON.
HENRY F. KURTZ.